(12) United States Patent
Webb et al.

(10) Patent No.: US 9,377,333 B1
(45) Date of Patent: Jun. 28, 2016

(54) TURBINE FLOW METER

(71) Applicants: Lloyd A. Webb, Midland, TX (US); Trinten S. Bennett, Notrees, TX (US)

(72) Inventors: Lloyd A. Webb, Midland, TX (US); Trinten S. Bennett, Notrees, TX (US)

( * ) Notice: Subject to any disclaimer, the term of this patent is extended or adjusted under 35 U.S.C. 154(b) by 0 days.

(21) Appl. No.: 14/465,961

(22) Filed: Aug. 22, 2014

(51) Int. Cl.
*G01F 1/07* (2006.01)
*G01F 1/115* (2006.01)
*F16L 15/04* (2006.01)

(52) U.S. Cl.
CPC .............. *G01F 1/115* (2013.01); *F16L 15/04* (2013.01)

(58) Field of Classification Search
USPC .............................. 73/861.78, 861.88, 861.79
See application file for complete search history.

(56) References Cited

U.S. PATENT DOCUMENTS 3,680,379 A * 8/1972 Boyd ...................... G01F 1/11 324/174

OTHER PUBLICATIONS

FTI Flow Technology, Inc., "Turbine Flow Meter Measures Hydraulics in Heavy Equipment Applications," news item [online] retrieved from http://www.ftimeters.com/news/flowmeter_news0024.htm, Jan. 15, 2010, FTI Flow Technology, Inc., Tempe, AZ, USA. The exact date of publication is unknown. This document was published prior to the effective filing date of the instant application, namely, Aug. 22, 2014, and prior to any foreign priority date of the present application. [retrieved on Jan. 31, 2014].

George Fischer Signet, Inc., "Signet 2100 Turbine Sensor Operating Instructions," manual [online] retrieved from http://www.gfsignet.com, 2002, George Fischer Signet, Inc., El Monte, CA, USA. The exact date of publication is unknown. This document was published prior to the effective filing date of the instant application, namely, Aug. 22, 2014, and prior to any foreign priority date of the present application. [retrieved on Jan. 31, 2014].

George Fischer Signet, Inc., "GF Signet 2100 Turbine Sensor," manual [online] retrieved from http://www.gfsignet.com, 2002, George Fischer Signet, Inc., El Monte, CA, USA. The exact date of publication is unknown. This document was published prior to the effective filing date of the instant application, namely, Aug. 22, 2014, and prior to any foreign priority date of the present application. [retrieved on Jan. 31, 2014].

Flo-Tech by Hedland,"Turbine Flow Sensors," manual [online] retrieved from http://www.flo-tech.com, Aug. 2001, Pro-tech by Hedland, Racine, WI, USA. The exact date of publication is unknown. This document was published prior to the effective filing date of the instant application, namely, Aug. 22, 2014, and prior to any foreign priority date of the present application. [retrieved on Jan. 31, 2014].

(Continued)

*Primary Examiner* — Jewel V Thompson
(74) *Attorney, Agent, or Firm* — Mary M. Lee

(57) ABSTRACT

A turbine flow meter housing is provided for hot oil trucks and similar applications. The ends of the housing are configured with external threads and flat end faces with embedded O-rings for connection to the inlet and outlet pipes with hammer unions. Because of the flat end face style hammer union connections, the housing and turbine assembly can be removed for service and cleaning using only a hammer and without having to remove the inlet and outlet pipes. The housing is sized for use with 2-inch pipes and has an overall length of only 6.167 inches yet maintains a minimum crush zone of 0.157 inches on each end to prevent deformation when the hammer unions are tightened.

9 Claims, 4 Drawing Sheets

(56) References Cited

OTHER PUBLICATIONS

R&M Energy Systems, "Yale Hammer Unions," manual [online] retrieved from http://www.rmenergy.com, 2004, R&M Energy Systems, Borger, TX, USA. The exact date of publication is unknown. This document was published prior to the effective filing date of the instant application, namely, Aug. 22, 2014, and prior to any foreign priority date of the present application. [retrieved on Feb. 5, 2014].
Electronic Data Devices, "Product Catalog," excerpts of catalog [online] retrieved from http://www.eddevices.com/Catalog/EDD%20Catalog.pdf, Jan. 2004, Electronic Data Devices, Odessa, TX, USA. The exact date of publication is unknown. This document was published prior to the effective filing date of the instant application, namely, Aug. 22, 2014, and prior to any foreign priority date of the present application. [retrieved on Jan. 21, 2014].
Cameron International Corp., "Nuflo Liquid Turbine Flowmeter User Manual," manual [online] retrieved from http://www.c-a-m.com/flo, Sep. 2011, Cameron International Corp., Houston, TX, USA. The exact date of publication is unknown. This document was published prior to the effective filing date of the instant application, namely, Aug. 22, 2014, and prior to any foreign priority date of the present application. [retrieved on Jan. 21, 2014].
Cameron International Corp., "WECO 1502 Liquid Turbine Flowmeter User Manual," manual [online] retrieved from http://www.c-a-m.com/flo, Sep. 2008, Cameron International Corp., Houston, TX, USA. The exact date of publication is unknown. This document was published prior to the effective filing date of the instant application, namely, Aug. 22, 2014, and prior to any foreign priority date of the present application. [retrieved on Nov. 5, 2014].
FTI Flow Technology, Inc., "FT Series Turbine Flowmeters for Liquid," specification sheet [online] retrieved from http://www.ftimeters.com/pdfs/specification_sheets/db_turbine_ft_series_liquid_english.pdf, 2013, FTI Flow Technology, Inc., Tempe, AZ, USA. The exact date of publication is unknown. This document was published prior to the effective filing date of the instant application, namely, Aug. 22, 2014, and prior to any foreign priority date of the present application. [retrieved on Nov. 5, 2014].
FTI Flow Technology, Inc., "FT Series Turbine Flowmeters for Gas Applications," specification sheet [online] retrieved from http://www.ftimeters.com/pdfs/specification_sheets/db_turbine_ft_series_gas_english.pdf, 2011, FTI Flow Technology, Inc., Tempe, AZ, USA. The exact date of publication is unknown. This document was published prior to the effective filing date of the instant application, namely, Aug. 22, 2014, and prior to any foreign priority date of the present application. [retrieved on Nov. 5, 2014].
FTI Flow Technology, Inc., "Turbine Flowmeter-FT Series Quick Specs" [online] web page retrieved from http://www.ftimeters.com/products/turbine_flowmeters/ft_series.htm, FTI Flow Technology, Inc., Tempe, AZ, USA. The exact date of publication is unknown. This document was published prior to the effective filing date of the instant application, namely, Aug. 22, 2014, and prior to any foreign priority date of the present application. [retrieved on Nov. 5, 2014].
A 2-inch by 2-inch turbine flow meter with hammer union ends and identified by Part No. 5.2200U-300 has been sold by Electronic Data Devices of Odessa, Texas, since about 2009. The ends of the housing have external threads and flat, axial end faces with O-ring grooves for use with O-ring hammer union connectors. The housing also includes internal retaining ring grooves. The flow meter has the dimensions given in Exhibit A submitted herewith. The overall length of the flow meter is 6.500 inches. The length of the "crush zone" is 0.313 inches. Electronic Data Devices, Flow Meter Machining Drawing, 2"X2" Turbine Flow Meter w/300 Union Ends, Part No. 5.2200U-300, drawing with specifications, Oct. 29, 2009, 1 page, Electronic Data Devices, Odessa, Texas, USA.

\* cited by examiner

TURBINE FLOW METER

FIELD OF THE INVENTION

The present invention relates to flow meters generally and, more particularly but without limitation, to turbine flow meters.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

DETAILED DESCRIPTION OF THE PREFERRED EMBODIMENT(S)

A hot oil truck is designed to circulate heated fluid into piping, tubing, casing, or tanks at or near an oil or gas well for a variety of reasons, including the removal of paraffin and tar-based oils. It is often necessary or desirable to monitor the flow rate of fluids being circulated through the truck. Various devices have been employed for this purpose, such as site glasses and flow meters. Turbine flow meters are preferred as they are highly accurate.

Turbine flow meters generally comprise a housing having inlet and outlet ports at respective ends thereof. A shaft is located inside the housing along the housing's longitudinal axis. A turbine rotor mounted on the shaft rotates when fluid (liquid or gas) flows through the housing via the inlet and outlet ports. The rotor is made of a magnetic material such that its rotation is detected by a pickup coil mounted to the housing. As a result, the flow rate of the fluid flowing through the housing can be determined.

Although accurate, turbine flow meters have certain disadvantages in the context of hot oil trucks. For example, turbine flow meters connected with Victaulic couplings often suffer deformation of the housing. Hammer unions utilizing tapered male and female ends require removal or repositioning of the connecting pipes in order to remove the flow meter and housing for cleaning and servicing. Turbine flow meters with flat end faces for use with O-ring hammer unions are known but heretofore have not been available in a size suitable for use on hot oil trucks.

The present invention provides a turbine flow meter for two-inch piping typically found on hot oil trucks. The housing is long enough to accommodate a conventional two-inch single rotor flow meter and magnetic pick-up. The ends of the housing define flat annular end faces with O-ring grooves connectable to the inlet and outlet pipes using conventional O-ring style hammer unions. However, the length of the housing is shorter than in conventional turbine flow meters. This reconfiguring of the housing has been accomplished while still maintaining a minimal "crush zone" between the back of the O-ring groove and the retainer ring groove to prevent deformation of the housing when the hammer union is tightened. These and other features and advantages of the present invention will be apparent from the flowing description.

Figure 1:
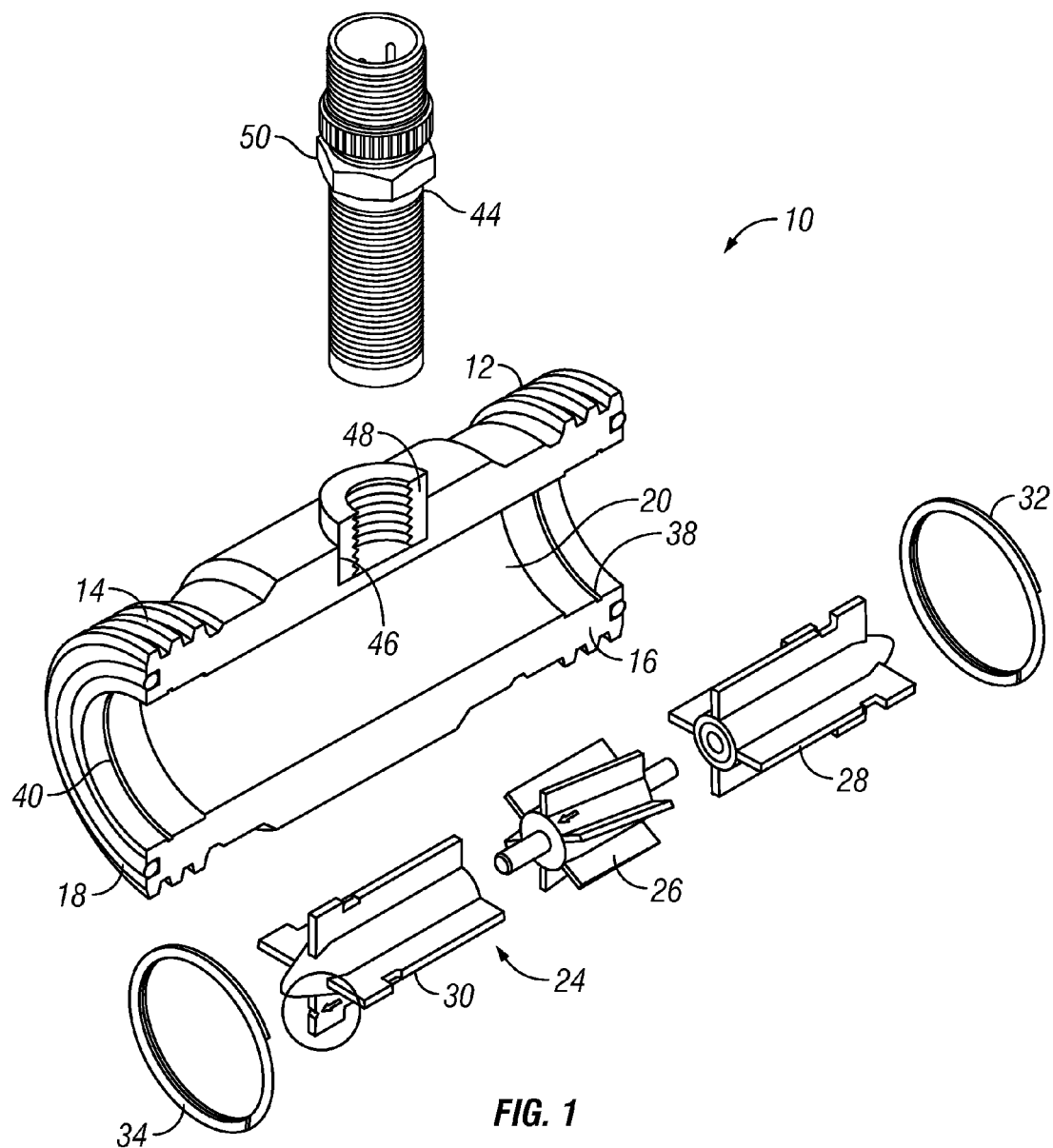
FIG. 1 is an exploded perspective view of the turbine flow meter assembly constructed in accordance with a preferred embodiment of the present invention.

Turning now to the drawings in general and to FIG. 1 in particular, there is shown therein an exploded view of a turbine flow meter made in accordance with a preferred embodiment of the present invention and designated generally by the reference numeral 10. The flow meter 10 generally comprises a housing 12 comprising a generally cylindrical tubular body 14 sized for use with two inch pipe. As used herein, pipe sizes are given in nominal pipe sizes. The tubular body 14 has an inlet or upstream end 16 and an outlet or downstream end 18 with a flow channel 20 extending therebetween.

The flow meter 10 includes a turbine 24 comprising a rotor and shaft 26, upstream vane 28, downstream vane 30, upstream or first retainer ring 32, and downstream or second retainer ring 34. The retainer rings 32 and 34 are received in internal retaining ring grooves 38 and 40 in the inner side wall of the housing body 14. A preferred turbine flow meter kit is commercially available from Electronic Data Devices of Odessa, Tex., as EDD two inch (2") turbine repair kit part number 5.250.

Referring still to FIG. 1, the flow meter 10 further comprises a magnetic pick-up 44. To receive the pick-up 44, the housing body 14 includes a side port 46 equipped with an internally threaded bushing 48. Preferred magnetic pickup assemblies, also available from Electronic Data Devices, include digital magnetic pick-up model 4.304 (2-wire) and model no. 4.5015U (3-wire), depending on the display. A locknut 50 may be included.

Figure 2:
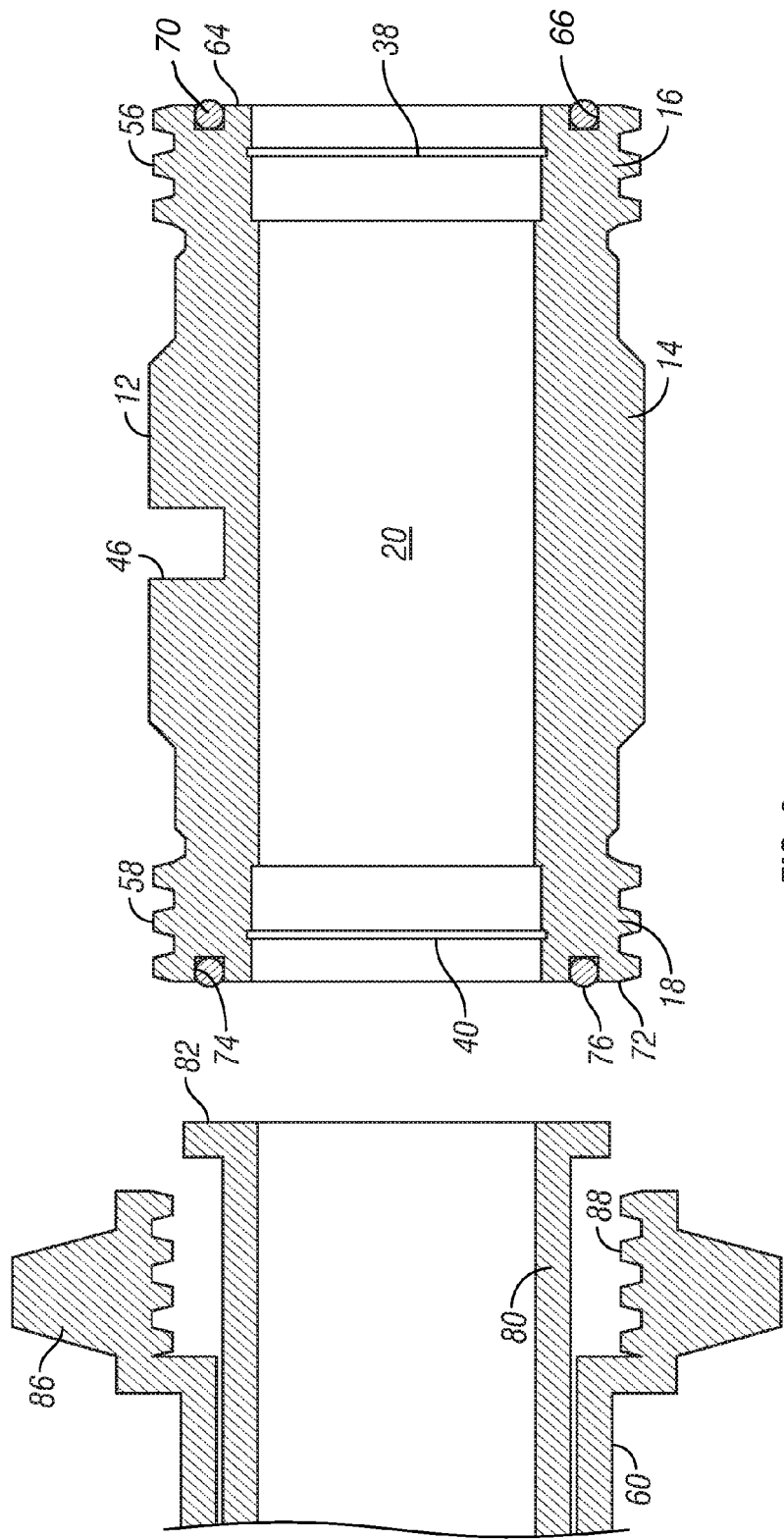
FIG. 2 is an exploded longitudinal sectional view of the housing of the preferred flow meter shown in FIG. 1 illustrating the end-to-end connection with the outlet pipe secured by an O-ring hammer union.

Turning now to FIG. 2, the housing body 14 will be described in more detail. The inlet end 16 includes external threads 56 for engaging with the first hammer union connector (not shown). The outlet end 18 includes external threads 58 for engaging with the second hammer union connector 60. The inlet end 16 has a flat, axial end face 64 including an O-ring groove 66 and O-ring 70. The outlet end 18 has a flat, axial end face 72 including an O-ring groove 74 and O-ring 76. As shown, the internal retaining ring grooves 38 and 40 are spaced a distance inward from the end faces 64 and 72, respectively.

The hammer union connection of the downstream end 18 is shown, it being understood that the hammer union connection for the upstream end 16 is a mirror image thereof and therefore is not illustrated. The downstream or outlet pipe 80 of the system is equipped with an end fitting having a flat end face 82 configured to abut the end face 72 of the housing body 14. The hammer union 86 is slidably received on the pipe 80 and is internally threaded at 88 to engage the external threads 58 on the housing body 14 in a known manner. A preferred hammer union that is commercially available is Iron Mule brand O-ring hammer union model number 00726A made by Iron Mule Products, Inc. of Cassville, Mo.

Figure 3:
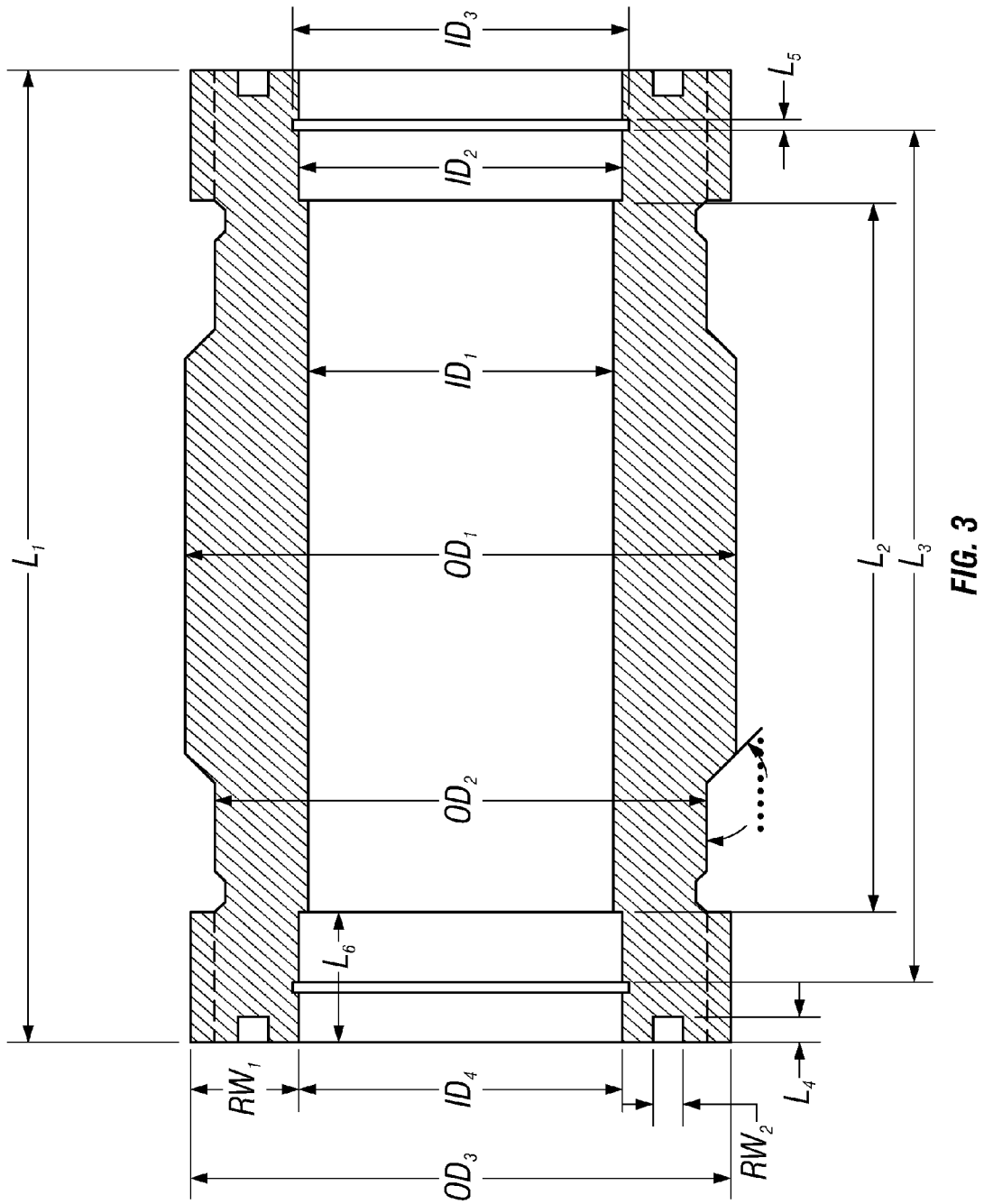
FIG. 3 is an enlarged longitudinal sectional view of the turbine housing denoting the various dimensions.

With reference now to FIG. 3, the preferred dimensions for the housing body 14 are those listed in the table shown below:

TABLE

| Reference Character | Dimension (in inches) |
|---|---|
| $L_1$ | 6.167 |
| $L_2$ | 4.513 |
| $L_3$ | 5.433 |

TABLE-continued

| Reference Character | Dimension (in inches) |
|---|---|
| $L_4$ | 0.157 |
| $L_5$ | 0.063 |
| $L_6$ | 0.827 |
| $ID_1$ | 1.940 |
| $ID_2$ | 2.062 |
| $ID_3$ | 2.125 |
| $ID_4$ | 2.062 |
| $OD_1$ | 3.500 |
| $OD_2$ | 3.125 |
| $OD_3$ | 3.425 |
| $RW_1$ | 0.682 |
| $RW_2$ | 0.157 |

As shown in FIG. 3 and listed in Table 1, the overall length $L_1$ of the housing body 14, that is, the end-to-end length extending between the end face 64 of the inlet end 16 and the end face 72 of the outlet end 18, is between about 6.100 and about 6.200 inches. More preferably, the overall length $L_1$ of the housing body 14 is between about 6.160 and 1.170 inches, and most preferably is 6.167 inches. This length is shorter than the length of the housing in conventional two-inch turbine flow meters and makes this inventive flow meter particularly adapted for use on hot oil trucks and other such environments where the space is peculiarly limited.

Figure 4:
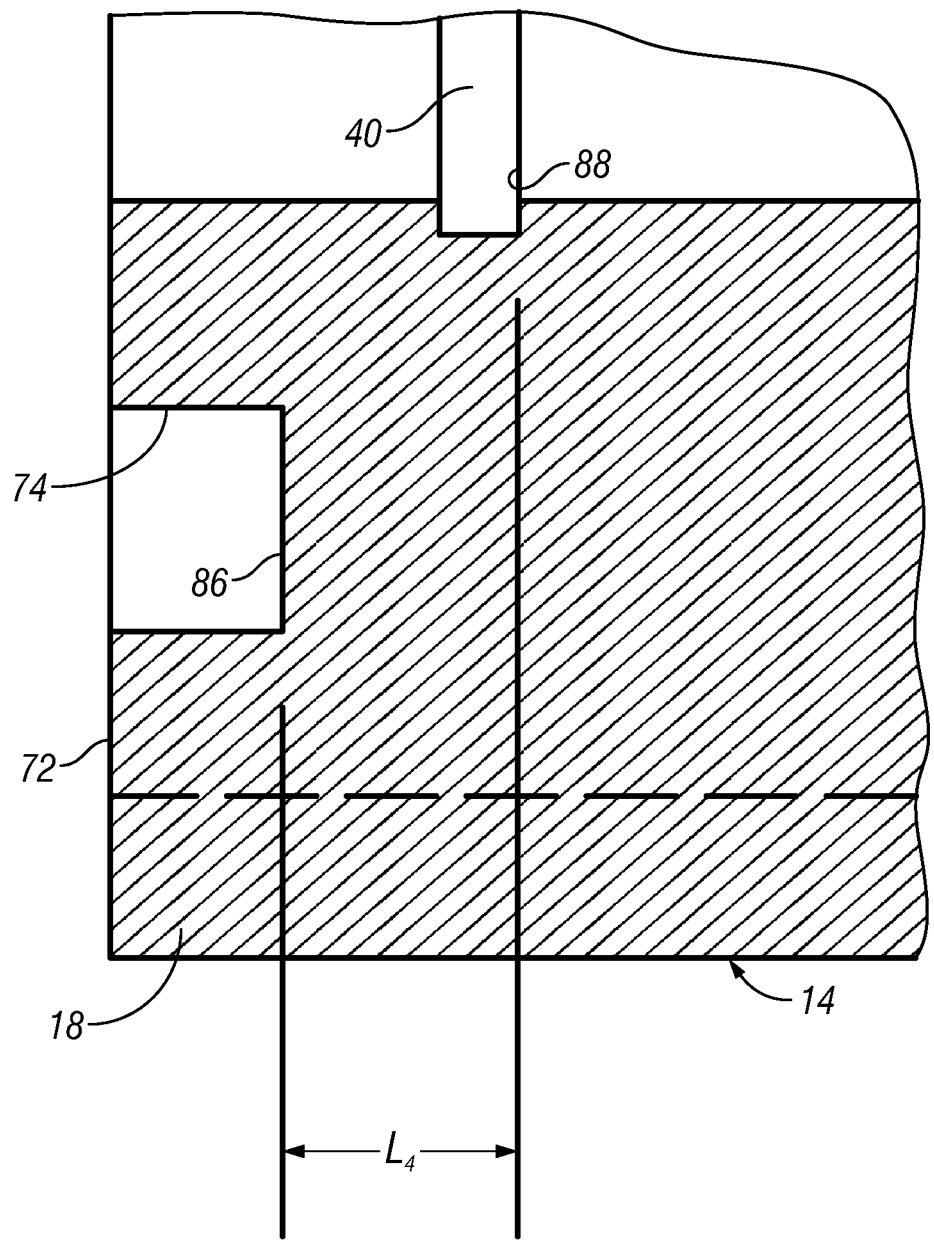
FIG. 4 is a further enlarged fragmented view of an end of the housing illustrating the crush zone.

Turning now to FIG. 4, the significance of certain dimensions will be explained. The O-ring groove 74 is generally U-shaped in cross-section, though this shape is not essential. The bottom or rear wall 86, that is, the innermost surface of the O-ring groove 74, is designated at 86. The retainer ring groove 40 also is generally U-shaped in cross section and includes an inner edge at 88. The so-called "crush zone," identified in the drawings here as $L_4$, is that dimension between the rear wall 86 of the O-ring groove 74 and the inner edge 88 of the retainer ring groove 40. It is this area that is prone to deformation during make-up and break-down of the joint. In accordance with the present invention, this dimension is at least about 0.150 inch and most preferably is 0.157 inch.

For the purpose of this description, the words left, right, front, rear, top, bottom, inner, outer, inside, and outside may be used to describe the various parts and directions of the invention as depicted in the drawings. These descriptive terms should not be considered as limiting the possible orientations of the invention or how it may be used. The terms are merely used to describe the various parts and directions so they may be readily understood and located in the drawings.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A housing for use with a two-inch turbine flow meter and first and second O-ring hammer union connectors, wherein the flow meter comprises first and second retainer rings for mounting the flow meter inside the housing, and wherein the flow meter housing comprises:
    a generally cylindrical tubular body sized for use with two-inch pipe, the body defining an inlet end and an outlet end and a flow channel extending therebetween;
    wherein the inlet end includes external threads for engaging with the first hammer union connector, wherein the inlet end has a flat, axial end face including an O-ring groove, and wherein the inlet end includes an internal retaining ring groove spaced a distance inward from the end face of the inlet end for receiving the first retainer ring of the flow meter;
    wherein the outlet end includes external threads for engaging with the second hammer union connector, wherein the outlet end has a flat, axial end face including an O-ring groove, and wherein the outlet end includes an internal retaining ring groove spaced a distance inward from the end face of the outlet end for receiving the second retainer ring of the flow meter; and
    wherein the tubular body has an end-to-end length extending between the end face of the inlet end and the end face of the outlet end, the length being between 6.100 and 6.200 inches.

2. The housing of claim 1 wherein the end-to-end length of the tubular body is between 6.160 inches and 6.170 inches.

3. The housing of claim 2 wherein the end-to-end length of the tubular body is 6.167 inches.

4. The housing of claim 3 wherein the retainer ring groove in the inlet end and the outlet end includes an inner edge, wherein the O-ring groove in the inlet end and the outlet end has a rear wall, and wherein the inlet end and outlet end each defines a crush zone extending between the rear wall of the O-ring groove and the inner edge of the retainer ring groove, and wherein the length of the crush zone in the inlet end and the outlet end is at least about 0.150 inch.

5. The housing of claim 4 wherein the length of the crush zone is 0.157 inch.

6. The housing of claim 1 wherein the retainer ring groove in the inlet end and the outlet end includes an inner edge, wherein the O-ring groove in the inlet end and the outlet end has a rear wall, and wherein the inlet end and outlet end each defines a crush zone extending between the rear wall of the O-ring groove and the inner edge of the retainer ring groove, and wherein the length of the crush zone in the inlet end and the outlet end is at least about 0.150 inch.

7. The housing of claim 6 wherein the length of the crush zone is 0.157 inch.

8. The housing of claim 1 wherein the housing includes a pick-up port in the side of the tubular body and an internally threaded bushing for receiving a magnetic pick-up.

9. A turbine flow meter comprising a turbine wheel, a magnetic pickup, and the housing of claim 1.

* * * * *